United States Patent
Stiller et al.

(10) Patent No.: US 6,341,766 B1
(45) Date of Patent: Jan. 29, 2002

(54) TWO-CHAMBER ENGINE MOUNT (75) Inventors: Ulrich Stiller, Weidern; Mathias Gugsch, Strassenhaus, both of (DE)

(73) Assignee: BTR AVS Technical Center GmbH, Hoehr-Grenzhausen (DE)

( * ) Notice: Subject to any disclaimer, the term of this patent is extended or adjusted under 35 U.S.C. 154(b) by 0 days.

(21) Appl. No.: 09/483,029

(22) Filed: Jan. 13, 2000

Related U.S. Application Data (63) Continuation of application No. PCT/EP99/03161, filed on May 7, 1999.

(30) Foreign Application Priority Data

May 13, 1998 (DE) .......................................... 198 21 508

(51) Int. Cl.$^7$ ................................................ F16F 5/00
(52) U.S. Cl. ................................... 267/140.13; 267/219
(58) Field of Search .................... 267/140.11, 140.13, 267/140.3, 140.4, 141.3, 141.4, 141.5, 219, 136, 140.12; 248/562, 636

(56) References Cited

U.S. PATENT DOCUMENTS

| | | | | |
|---|---|---|---|---|
| 4,342,446 A | * | 8/1982 | Eaton et al. ................... 267/35 |
| 4,730,584 A | * | 3/1988 | Jordens et al. ......... 267/140.14 |
| 4,842,258 A | * | 6/1989 | Misaka et al. ......... 267/140.13 |
| 4,872,652 A | * | 10/1989 | Rohner et al. ......... 267/140.14 |
| 4,921,049 A | * | 5/1990 | Kaiser et al. .......... 267/140.13 |
| 5,104,100 A | * | 4/1992 | Simuttis ................. 267/140.13 |
| 5,284,315 A | * | 2/1994 | Hofmann et al. ........... 248/562 |
| 5,927,698 A | * | 7/1999 | Miyoshi et al. ........ 267/140.13 |

* cited by examiner

Primary Examiner—Matthew C. Graham
Assistant Examiner—Mariano Sy
(74) Attorney, Agent, or Firm—Herbert L. Lerner; Laurence A. Greenberg; Werner H. Stemer (57) ABSTRACT

A two-chamber engine mount, especially for motor vehicles, includes a housing having an interior accommodating a supporting spring made of an elastomeric material dividing the interior of the housing into a working chamber and a compensating chamber closed off from the surroundings by an elastomeric diaphragm. The working chamber and the compensating chamber are filled with a hydraulic fluid and are connected to each other through an overflow passage. At least one plunger is configured as a radial stop in the compensating chamber.

14 Claims, 5 Drawing Sheets

TWO-CHAMBER ENGINE MOUNT

CROSS-REFERENCE TO RELATED APPLICATION

This application is a continuation of copending International Application No. PCT/EP99/03161, filed May 7, 1999, which designated the United States.

BACKGROUND OF THE INVENTION

Field of the Invention

The invention relates to a two-chamber engine mount, especially for motor vehicles, including a housing having an interior accommodating a supporting spring made an elastomeric material dividing the interior into a working chamber and a compensating chamber closed off from the surroundings by an elastomeric diaphragm, the working chamber and the compensating chamber being filled with a hydraulic fluid and connected to each other through an overflow passage.

One such two-chamber engine mount is known from European Patent Application 0 253 373 A1. In that known two-chamber engine mount a supporting spring of an elastomeric material is accommodated in a cylindrical housing. The supporting spring divides the interior of the housing into a working chamber and a compensating chamber disposed at an outer periphery of the supporting spring. The two chambers are connected through an overflow passage. A mount core which is vulcanized in place in the supporting spring is to be secured to an engine. A flange which is applied to the mount core clasps the outside of the housing with a clearance and serves as an axial stop. The flange is an additional component which complicates assembly and simultaneously increases the weight and overall dimensions of the mount.

SUMMARY OF THE INVENTION

It is accordingly an object of the invention to provide a two-chamber engine mount, which overcomes the hereinafore-mentioned disadvantages of the heretofore-known devices of this general type and which is further developed so that a radial stop is provided for a supporting spring while achieving compact dimensions and facilitated assembly.

With the foregoing and other objects in view there is provided, in accordance with the invention, a two-chamber engine mount, especially for motor vehicles, comprising a housing having an interior; a supporting spring of an elastomeric material disposed in the interior and dividing the interior into a working chamber and a compensating chamber to be filled with a hydraulic fluid; an overflow passage interconnecting the working chamber and compensating chamber; an elastomeric diaphragm closing off the compensating chamber from the surroundings; and at least one plunger disposed in the compensating chamber as a radial stop.

The plunger provided in accordance with the invention improves the acoustic response in the higher frequency range, more particularly in the frequency range between 80 and 160 Hz. The plunger results in a considerable reduction in the dynamic stiffness in the desired frequency range, often down to a value below that of the static stiffness. This reduction is termed high-frequency isolation. At the same time the plunger acts as a radial stop.

In the two-chamber engine mount in accordance with the invention the working chamber is advantageously defined by the supporting spring and the housing. The compensating chamber surrounds the working chamber and is defined by the supporting spring, the housing and an elastomeric diaphragm. Such a mount is also termed a "pot mount".

In accordance with another feature of the invention, the plunger is integral with or formed as one piece with the supporting spring. The integral configuration facilitates producing and assembling the two-chamber engine mount in accordance with the invention. The plunger is vulcanized in place with the mount core in a single operation during production.

In accordance with a further feature of the invention, the plunger is separate from the supporting spring on an outer wall surface of the compensating chamber. Although the plunger is produced as a separate component in this embodiment, placing it at the outer wall surface of the compensating chamber is speedy and facilitated.

In accordance with an added feature of the invention, there is provided a combination of these two plunger configurations. In this case a plunger configured integrally with the supporting spring cooperates with a plunger disposed at the outer wall surface of the compensating chamber.

In all of the embodiments the plunger or plungers achieve high-frequency isolation. A plunger gap formed between the plunger and the outer wall surface of the working chamber or the supporting spring or between the two plungers is significant in this regard. The dimensions of this plunger gap are a factor significantly characterizing the high-frequency isolation.

The parameters referred to as plunger diameter, plunger gap and gap length, which are significant in dictating the dynamic response, are freely selectable by placing the plunger in the compensating chamber. When use is made of a plunger disposed at the supporting spring, the plunger gap is formed between the plunger and the outer wall surface of the compensating chamber. This plunger gap is independent of the position of the plunger, thus achieving a dynamic response independent of the settlement of the hydro-elastic mount.

In accordance with an additional feature of the invention, the plunger is shiftingly guided at the outer wall surface in the direction of a centerline through the engine mount. This enables stops or fastener elements for the plunger to be eliminated and thus facilitates assembly and reduction of weight without detriment to the dual function of the plunger as a radial stop and for high-frequency isolation.

In accordance with yet another feature of the invention, the plunger includes a leaf spring vulcanized in place to boost the radial stiffness. The leaf spring may be simply vulcanized in place in the plunger to enable the radial stiffness to be "tuned" to the existing boundary conditions.

In accordance with yet a further feature of the invention, there is provided at least one axial stop to define the movement of the supporting spring in the direction of its centerline. The axial stop prevents prohibitively large movements of the supporting spring in avoiding the engine mount from being damaged or ruined.

In accordance with yet an added feature of the invention, the axial stop is configured as a protruding portion of a bottom of the housing, requiring no additional components, thus simplifying production and assembly of the two-chamber engine mount in accordance with the invention.

In accordance with yet an additional feature of the invention, the axial stop is rigidly connected to the housing from which it protrudes radially. The outer diameters of the two-chamber engine mount in accordance with the invention are thus maintained compact.

Advantageously, both axial stops are combined in such a way that they define the movements of the supporting spring in two opposing directions, thus preventing prohibitive movements of the supporting spring in the direction of both the engine and the vehicle body.

Advantageously the first axial stop cooperates with a projection configured integrally with the supporting spring, and the second with a plunger configured integrally with the supporting spring. The projection and the plunger may be vulcanized in place in a single operation with the mount core in producing the supporting spring.

In accordance with again another feature of the invention, the supporting spring has a gap in which a movable isolation diaphragm is accommodated with clearance. This isolation diaphragm, like the plunger, results in a reduction in the dynamic stiffness in a specific frequency range.

Advantageously, the plunger is configured in such a way that it results in a high-frequency isolation in a first frequency range while a high-frequency isolation is achieved in a second frequency range by the isolation diaphragm, thus achieving an improvement in the acoustic response in two frequency ranges that are separate from each other. As an alternative the isolation diaphragm and the plunger may be constructed for a high-frequency isolation in the same frequency range so that the dynamic stiffness is significantly reduced.

In accordance with again a further feature of the invention, the isolation diaphragm and the gap are disposed parallel to a centerline of the engine mount. The term "parallel" in this sense is understood to mean that the isolation diaphragm and the gap are oriented perpendicular to the plane which in turn stands perpendicular to the centerline of the engine mount. This embodiment permits a configuration and assembly which is simple.

In accordance with again an added feature of the invention, the isolation diaphragm has the shape of a ring segment. The isolation diaphragm and the gap in this embodiment are disposed concentric to the centerline of the engine mount.

In accordance with again an additional feature of the invention, the supporting spring forms ridges defining the gap and passages located in-between for fluid actuation of the isolation diaphragm. These ridges assure the stability of the supporting spring. The stability is difficult to achieve with a large full-length opening for fluid actuation of the isolation diaphragm. At the same time the passages between the ridges permit a relatively large surface area fluid actuation of the isolation diaphragm.

In accordance with a concomitant feature of the invention, the isolation diaphragm is made of an elastomeric material, a substantially rigid material or a combination of these materials. The isolation diaphragm can be optimally "tuned" to the various boundary conditions by suitably selecting the material therefor.

Other features which are considered as characteristic for the invention are set forth in the appended claims.

Although the invention is illustrated and described herein as embodied in a two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
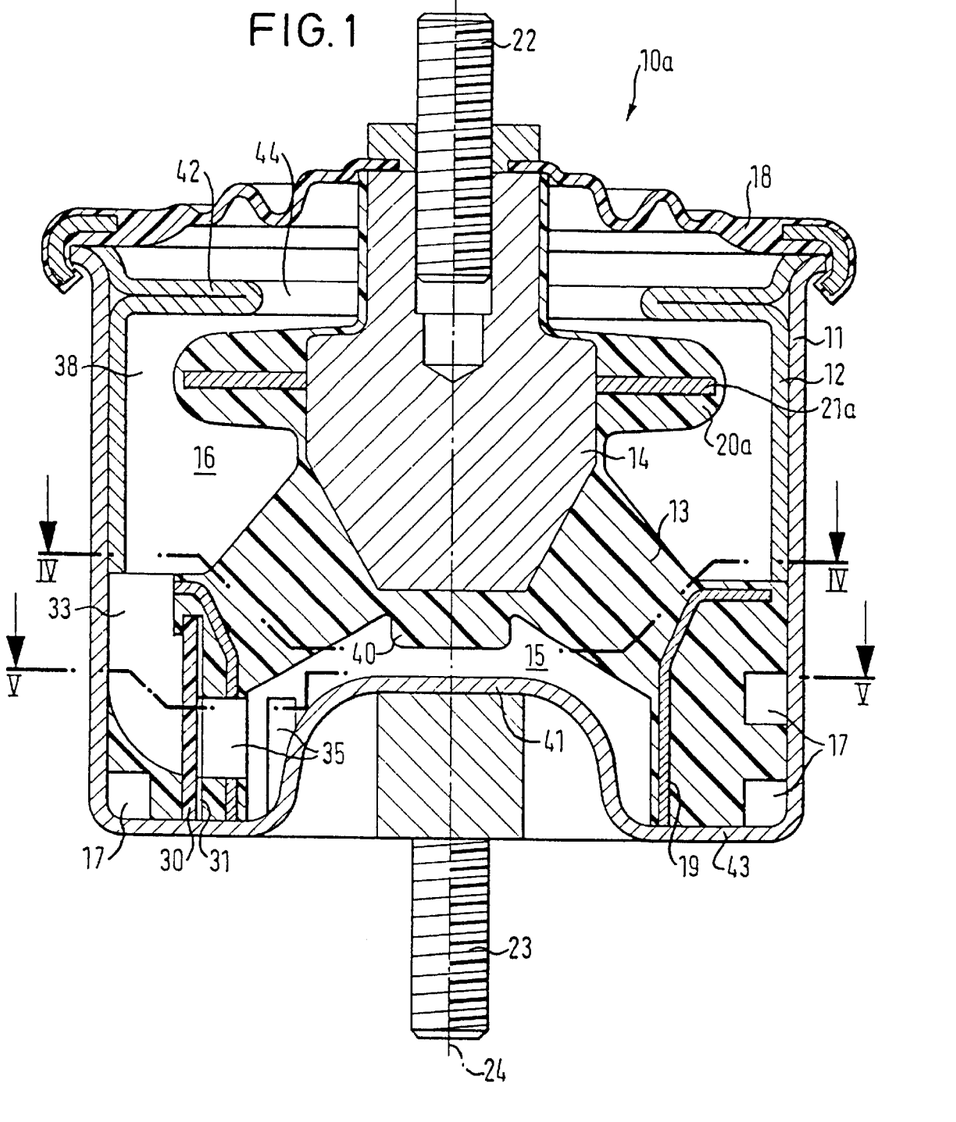
FIG. 1 is a diagrammatic, longitudinal-sectional view of a first embodiment of a two-chamber engine mount in accordance with the invention.

Referring now to the figures of the drawings in detail and first, particularly, to FIG. 1 thereof, there is seen a first embodiment of an engine mount 10a in accordance with the invention, including a housing 11 having an interior in which an insert 12 as well as a supporting spring 13 with a mount core 14 vulcanized in place are incorporated. The conical supporting spring 13 divides the interior of the housing 11 into a working chamber 15 and a compensating chamber 16 connected to each other through an overflow passage 17. The overflow passage 17 has an approximately spiral run along an inner wall surface of the housing 11 through the supporting spring 13, as a result of which a large length of the overflow passage 17 is assured.

The compensating chamber 16 is closed off from the surroundings by an elastomeric diaphragm 18. A stiffener 19 is provided in order to boost the stability of the supporting spring 13.

In this embodiment, a plunger 20a is configured to be integral with or part of the supporting spring 13. The plunger 20a has a leaf spring 21a vulcanized in place to boost its radial stiffness.

The engine mount 10a is secured through the use of studs 22, 23 disposed concentrically to a centerline 24 of the engine mount 10a.

An isolation or decoupling diaphragm 30, which is provided between the working chamber 15 and the compensating chamber 16, is disposed in a gap 31 in the supporting spring 13. The manner in which the isolation diaphragm 30 is mounted and acts will be described in detail with reference to FIGS. 4 and 5.

Two axial stops 41, 42 are provided in order to define the movement of the mount core 14 in the direction of the centerline 24. The axial stop 41 is configured as a protruding portion of a bottom 43 of the housing 11 and cooperates with a projection 40 of the supporting spring 13. The other axial stop 42 is rigidly connected to the housing 11, protrudes radially therefrom and defines the movement of the mount core 14 in the opposite direction. Prohibitively large movements cause the plunger 20a to be stopped by the axial stop 42.

The axial stop 42 has an opening 44 for the mount core 14. The size of the opening 44 is selected in such a way that the mount core 14 does not come into contact with the axial stop 42.

The working chamber 15, the compensating chamber 16 and the overflow passage 17 are filled with a hydraulic fluid.

Any displacement of the mount core 14 relative to the housing 11 changes the volume of the working chamber 15 so that the hydraulic fluid flows through the overflow passage 17. The hydraulic damping opposes the movement of the mount core 14. At the same time the hydraulic fluid flows through a plunger gap 38 formed between the plunger 20a and the insert 12. In this case too, hydraulic damping occurs which opposes movement of the mount core 14. This results in a reduction in the dynamic stiffness, depending on the location and size of the plunger gap 38. At the same time, the isolation diaphragm 30 moves in the gap 31 which likewise results in a reduction in the dynamic stiffness.

As mentioned above, any prohibitively large movement of the mount core 14 is prevented by the axial stops 41, 42. The plunger 20a serves as a radial stop. When the mount core 14 is exposed to forces which are not oriented parallel to the centerline, the mount core will radially deflect. Should a prohibitively large radial deflection occur, the plunger 20a will come into contact with the insert 12 to oppose any further deflection. The radial stiffness of the plunger 20a is boosted by the leaf spring 21 that is vulcanized in place, so that prohibitive deformations or damage to the plunger 20a need not be feared. In this configuration the leaf spring 21a does not come into contact with the insert 12 since the leaf spring is covered by the supporting spring 13. It is this coverage that reliably prevents any rattling or similar disturbing noise.

Figure 2:
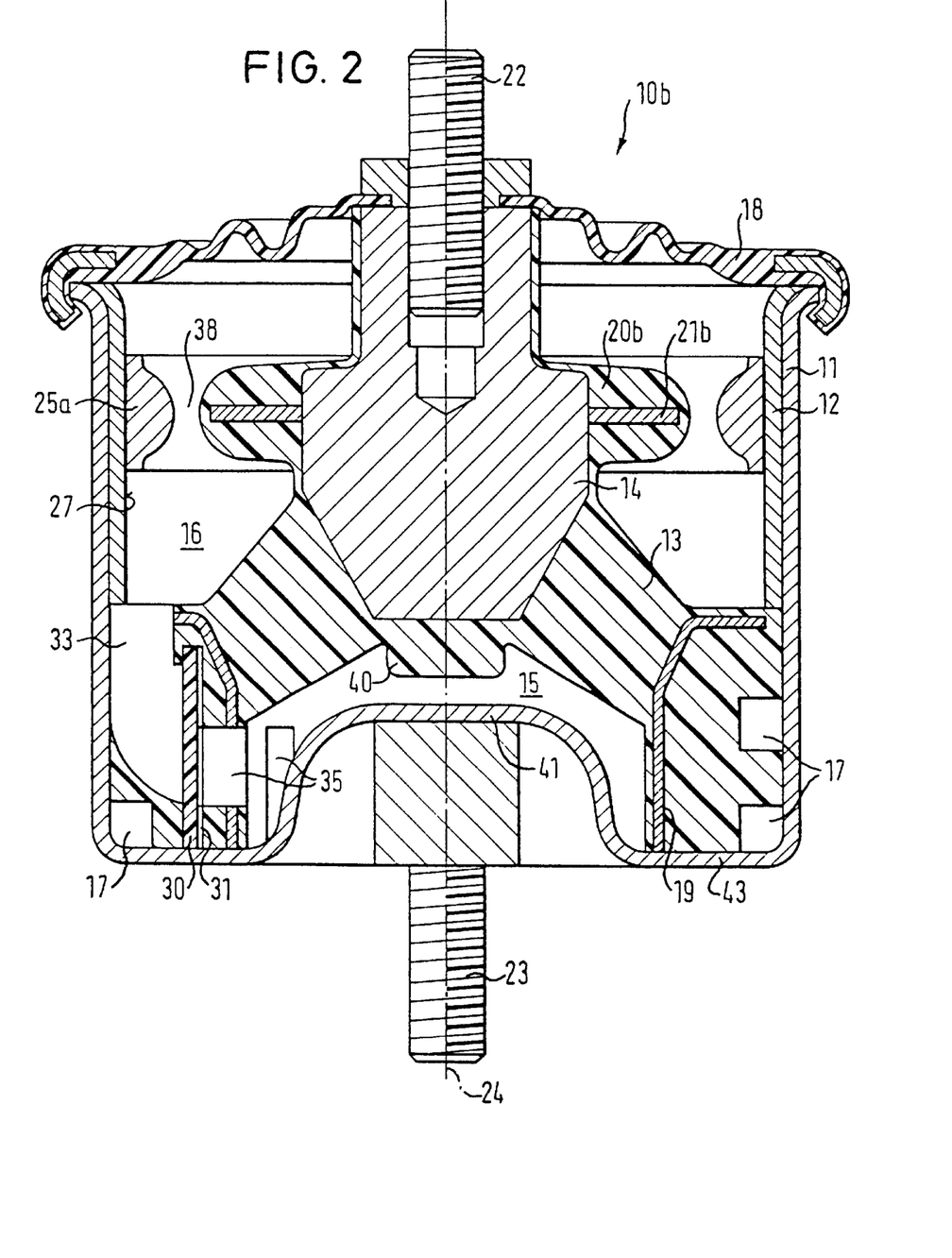
FIG. 2 is a view similar to FIG. 1, illustrating a second embodiment of the invention.
Figure 3:
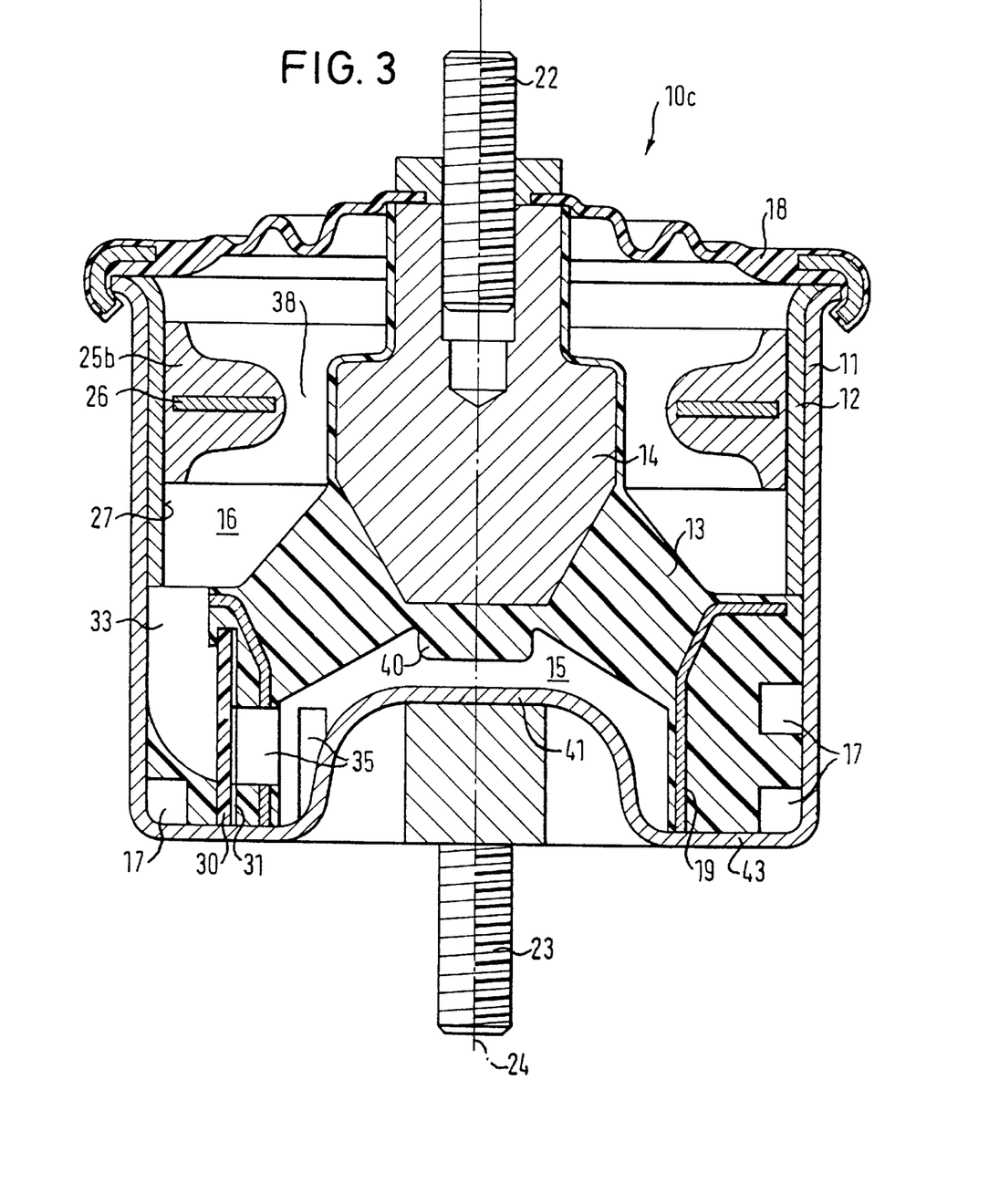
FIG. 3 is a view similar to FIG. 1, illustrating a third embodiment of the invention.

Referring now to FIGS. 2 and 3, it is seen that each illustrates a further embodiment of an engine mount 10b, 10c in accordance with the invention. Components which are like or similar to those illustrated in FIG. 1 are identified by like reference numerals. In order to avoid tedious repetition, reference is made to the description relating to FIG. 1 to explain these components and how they function.

The embodiment shown in FIG. 2 provides a plunger 20b which is configured integrally with or is part of the supporting spring 13. This plunger is configured to be smaller than the plunger 20a of the embodiment shown in FIG. 1. The plunger 20b has a leaf spring 21b vulcanized in place to boost the radial stiffness.

In this embodiment a further plunger 25a is disposed at an outer wall surface 27 of the compensating chamber 16. The plunger 25a shown in FIG. 2 may be shifted at the outer wall 27 in the direction of the centerline 24 of the engine mount 10b. The plunger gap 38 is formed between the plungers 20b, 25a.

The response of the engine mount 10b to loading and the hydraulic damping by the overflow passage 17, the isolation diaphragm 30 and the plunger gap 38 are the same as already described with reference to FIG. 1. The further plunger 25a is displaced as a function of the fluid flow and the damping parallel to the centerline 24 along the outer wall 27. The further plunger 25a additionally serves together with the plunger 20b as a radial stop.

Referring now to FIG. 3, there is seen a third embodiment of an engine mount 10c making use of a further plunger 25b disposed at the outer wall surface 27. The further plunger 25b is provided with a leaf spring 26 that is vulcanized in place to boost the radial stiffness. The plunger gap 38 is formed between the further plunger 25b and the supporting spring 13 surrounding the mount core 14. The further configuration and functioning of the individual components are the same as those in the embodiments shown in FIGS. 1 or 2.

Figure 4:
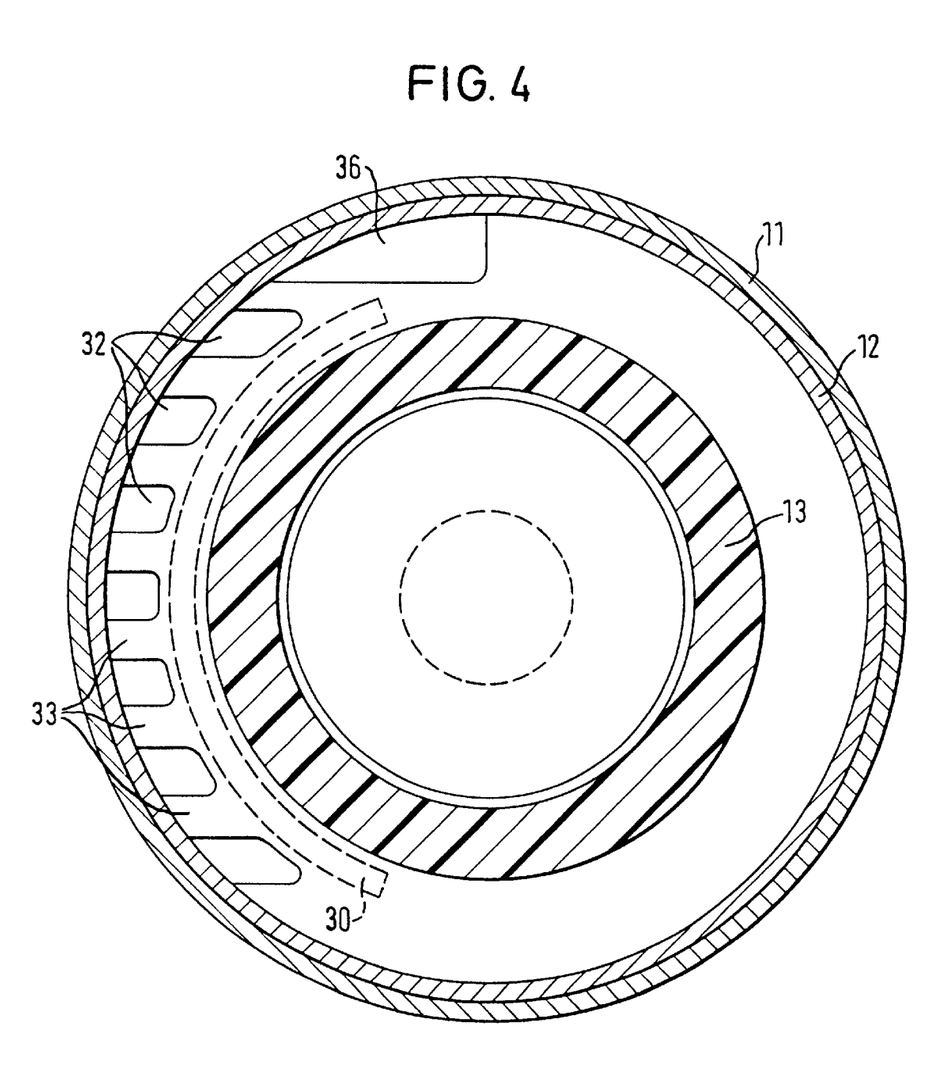
FIG. 4 is a cross-sectional view taken along a line IV—IV in FIG. 1, in the direction of the arrows.
Figure 5:
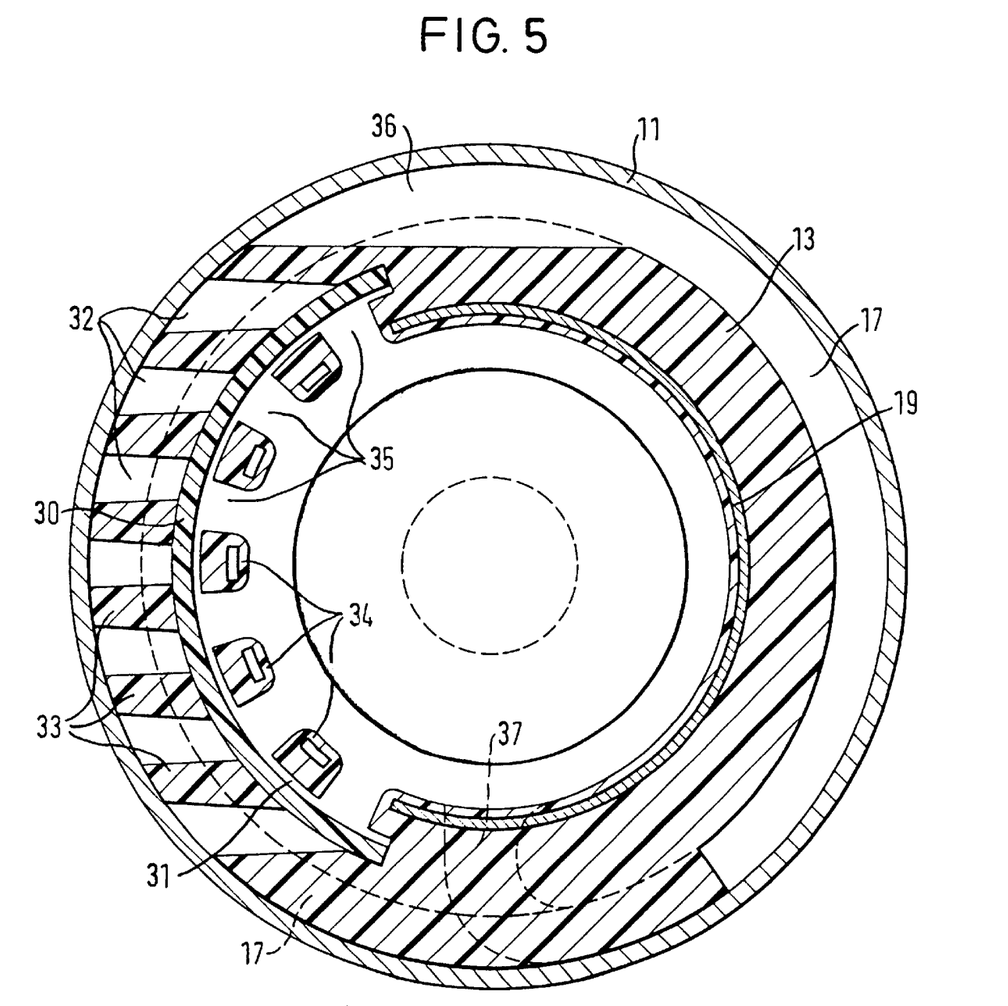
FIG. 5 is a cross-sectional view taken along a line V—V in FIG. 1, in the direction of the arrows.

Referring now to FIGS. 4 and 5, there are seen more-detailed illustrations of the way in which the isolation diaphragm 30 is mounted and fluidly actuated. The mounting and functioning are identical to that of the embodiments shown in FIGS. 1 to 3.

The isolation diaphragm 30 and the gap 31 in the supporting spring 13 have the shape of a ring segment and are disposed concentric to the centerline 24. In order to provide fluid actuation, the supporting spring 13 is provided in the direction of the compensating chamber 16 with a series of passages 32 and ridges 33 located therebetween. The hydraulic fluid comes into contact with the isolation diaphragm 30 through the passages 32.

The side of the supporting spring 13 facing the working chamber 15 forms passages 35 with ridges 34 located therebetween. The passages 35 permit fluid actuation of the isolation diaphragm 30 from the working chamber 15.

Any displacement of the mount core 14 relative to the housing 11 changes the volume of the working chamber 15, thereby resulting in a difference in pressure between that of the working chamber 15 and that of the compensating chamber 16. This difference in pressure is effective through the passages 32, 35 on the isolation diaphragm 30 and moves the isolation diaphragm 30 radially outwards, when an overpressure exists in the working chamber 15, until the isolation diaphragm comes into contact with the ridges 33. This is the position shown in FIG. 5. If the pressure in the working chamber 15 is less than that in the compensating chamber 16, the isolation diaphragm 30 is moved radially inwards until it comes into contact with the ridges 35 and the gap 31 is thereby defined by the ridges 33, 34.

During low-amplitude movements of the mount core 14, as occur usually when the engine is idling, the isolation diaphragm 30 isolates vibrations of the mount core 14 from the vehicle body.

During higher amplitude movements of the mount core 14, the hydraulic fluid flows through the overflow passage 17 so that it is thereby hydraulic damped. This hydraulic damping opposes movement of the mount core 14. The overflow passage 17 communicates through a port 36 with the compensating chamber 16 and through a further port 37 with the working chamber 15. Depending on the movement of the mount core 14 , the hydraulic fluid flows either from the working chamber 15 into the compensating chamber 16 or vice-versa.

The engine mount 10a, 10b, 10c in accordance with the invention permits radial support of the supporting spring by the plungers 20a, 20b, 25a, 25b which are provided in the compensating chamber and configured as a radial stop. The plungers 20a, 20b, 25a, 25b simultaneously result in a reduction in the dynamic stiffness which enhances the acoustic response of the engine mount 10a, 10b, 10c in accordance with the invention. A further improvement in the acoustic response is achieved by the isolation diaphragm 30. In addition to this the engine mount 10a, 10b, 10c is simple and cost-effective in production and assembly.

We claim:

1. A two-chamber engine mount, comprising:

a housing having an interior;

a supporting spring of an elastomeric material disposed in said interior and dividing said interior into a working chamber and a compensating chamber to be filled with a hydraulic fluid;

an overflow passage interconnecting said working chamber and compensating chamber;

an elastomeric diaphragm closing off said compensating chamber from the surroundings; and at least one plunger disposed in said compensating chamber as a radial stop.

2. The two-chamber engine mount according to claim 1, wherein said at least one plunger is integral with said supporting spring.

3. The two-chamber engine mount according to claim 1, wherein said compensating chamber has an outer wall surface, and said at least one plunger is disposed separate from said supporting spring at said outer wall surface.

4. The two-chamber engine mount according to claim 3, including an engine mount centerline, said at least one plunger to be shifted and guided at said outer wall surface in the direction of said centerline.

5. The two-chamber engine mount according to claim 1, wherein said at least one plunger has a leaf spring vulcanized in place for increasing radial stiffness.

6. The two-chamber engine mount according to claim 1, including a centerline, a mount core, and at least one axial stop for defining a movement of said mount core in the direction of said centerline.

7. The two-chamber engine mount according to claim 6, wherein said housing has a bottom, and said at least one axial stop is a protruding portion of said bottom.

8. The two-chamber engine mount according to claim 6, wherein said at least one axial stop is rigidly connected to and protrudes radially from said housing.

9. The two-chamber engine mount according to claim 1, including a movable isolation diaphragm accommodated with clearance in a gap formed in said supporting spring.

10. The two-chamber engine mount according to claim 9, including an engine mount centerline, said isolation diaphragm and said gap disposed parallel to said centerline.

11. The two-chamber engine mount according to claim 9, wherein said isolation diaphragm has the shape of a ring segment.

12. The two-chamber engine mount according to claim 9, wherein said supporting spring has ridges defining said gap and passages located between said ridges for fluid actuation of said isolation diaphragm.

13. The two-chamber engine mount according to claim 9, wherein said isolation diaphragm is made of a material selected from the group consisting of an elastomeric material, a substantially rigid material and a combination of an elastomeric material and a substantially rigid material.

14. The two-chamber engine mount according to claim 1, wherein said at least one plunger is formed as one piece with said supporting spring.

* * * * *

UNITED STATES PATENT AND TRADEMARK OFFICE
CERTIFICATE OF CORRECTION

PATENT NO.    : 6,341,766 B1
DATED         : January 29, 2002
INVENTOR(S)   : Ulrich Stiller et al.

It is certified that error appears in the above-identified patent and that said Letters Patent is hereby corrected as shown below:

<u>Title page,</u>
Item [75], should read as follows:
-- Ulrich Stiller, Niederzissen; Mathias Gugsch, Strassenhaus; both of (DE) --

Signed and Sealed this

Twenty-seventh Day of August, 2002

*Attest:*

JAMES E. ROGAN
*Director of the United States Patent and Trademark Office*

*Attesting Officer*